United States Patent
Inoue et al.

(10) Patent No.: US 8,579,561 B2
(45) Date of Patent: Nov. 12, 2013

(54) SPINDLE DEVICE OF MACHINE TOOL (75) Inventors: Atsushi Inoue, Hiroshima (JP);
Mutsumi Yoshikawa, Shiga (JP);
Hiroyuki Tauchi, Shiga (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1080 days.

(21) Appl. No.: 12/593,530

(22) PCT Filed: Mar. 27, 2008

(86) PCT No.: PCT/JP2008/055952
§ 371 (c)(1),
(2), (4) Date: Sep. 28, 2009

(87) PCT Pub. No.: WO2008/120692
PCT Pub. Date: Oct. 9, 2008

(65) Prior Publication Data
US 2010/0119320 A1    May 13, 2010

(30) Foreign Application Priority Data
Mar. 29, 2007   (JP) .................................. 2007-089274

(51) Int. Cl.
*B23B 31/10* (2006.01)
(52) U.S. Cl.
USPC ........................................................ 409/233
(58) Field of Classification Search
USPC ................................. 409/193, 194, 231, 233
IPC ......................................................... B23B 31/10
See application file for complete search history.

(56) References Cited

U.S. PATENT DOCUMENTS

| 4,254,676 A | 3/1981 | Wilson |
| 4,351,029 A | 9/1982 | Maxey et al. |
| 2001/0048858 A1 | 12/2001 | Akamatsu et al. |
| 2002/0013639 A1 | 1/2002 | Fujishima et al. |
| 2004/0208720 A1* | 10/2004 | Wehrfritz ...................... 409/231 |

FOREIGN PATENT DOCUMENTS

| DE | 30 23 413 A1 | 1/1982 | |
| DE | 19937447 A1 * | 2/2001 | ............. B23B 19/02 |
| DE | 20 2006 015 944 U1 | 1/2007 | |

(Continued)

OTHER PUBLICATIONS

JPO Machine Translation—Morikawa, Toshio, "Tool Clamping Force Measuring Device," Nov. 4, 1998.*

(Continued)

*Primary Examiner* — Daniel Howell
*Assistant Examiner* — Michael Vitale
(74) *Attorney, Agent, or Firm* — Birch, Stewart, Kolasch & Birch, LLP (57) ABSTRACT

A spindle device of machine tool includes a pressure sensor (31) that detects a pressing force to a rod (18) by a drive (25), a displacement sensor (32) that detects displacement of the rod (18), a tool clamping-force detector (33) that detects a clamping force to a tool (19) by a collet (20) based on the pressing force to the rod (18) and the displacement of the rod (18), and a spring-replacement-timing determining unit (36) that determines a replacement timing of disc springs (24) based on the tool clamping force and a preset biasing force characteristic value of the disc springs (24), thereby allowing highly accurate determination of a replacement timing of a biasing unit by appropriately detecting a tool clamping force.

12 Claims, 6 Drawing Sheets

(56) References Cited

FOREIGN PATENT DOCUMENTS

| | | | | |
|---|---|---|---|---|
| EP | 1462214 A1 | * | 9/2004 | ............ B23Q 17/00 |
| JP | 5-50359 A | | 3/1993 | |
| JP | 10-291105 A | | 11/1998 | |
| JP | 2001-315010 A | | 11/2001 | |
| JP | 2001-322013 A | | 11/2001 | |
| JP | 2002-137148 A | | 5/2002 | |
| JP | 2003-220504 A | | 8/2003 | |
| JP | 2004-268205 A | | 9/2004 | |
| JP | 2005028534 A | * | 2/2005 | ............ B23B 31/00 |
| JP | 2005-324277 A | | 11/2005 | |
| JP | 2007-168064 A | | 7/2007 | |
| TW | 589236 B | | 6/2004 | |

OTHER PUBLICATIONS

Notice of Allowance in Taiwan Patent Application dated Oct. 25, 2011.
Extended European Search Report in the European Patent Application No. 08739081.1 dated Mar. 8, 2013.

* cited by examiner

SPINDLE DEVICE OF MACHINE TOOL

BACKGROUND OF THE INVENTION

1. Field of the Invention

The present invention relates to a spindle device of machine tool such as a machining center that performs various types of machining by mounting a tool at a point of a spindle and rotating the tool at a high speed.

2. Description of the Related Art

In a general spindle device in machine tool, a spindle is rotatably supported in a housing, a rod is movably supported along an axial direction in the spindle, a collet that can clamp the tool is mounted at the point of the rod, and the rod is moved against a biasing force of a biasing unit of a disc spring by a drive, while the rod is biased by a plurality of disc springs in a tool clamping direction by the collet, thereby enabling unclamping of the tool by the collet.

In the spindle device in machine tool configured in this manner, the collet clamps the tool by the biasing force of the disc spring. Therefore, a decrease in the biasing force of the disc spring largely affects machining accuracy by the tool. That is, if the biasing force of the disc spring decreases due to long time use, the collet cannot appropriately clamp the tool, and therefore not only a force of constraint of the spindle with respect to the tool decreases to decrease the machining accuracy by cutting of products, but also a surface damage such as fretting occurs in a clamping portion between the spindle and the tool.

Accordingly, for example, Patent documents 1 and 2 disclose a unit that monitors a biasing force of a spring for clamping a tool to a spindle in a spindle device in machine tool.

A tool-clamping-spring monitoring device in a spindle device of machine tool described in the Patent document 1, a pressure sensor measures a spring force of a disc spring at the time of moving a draw bar in a tool releasing direction by a hydraulic cylinder, a comparator compares the spring force measured by the pressure sensor with a predetermined reference value, and a determination unit determines a state of the disc spring based on a comparison result of the comparator. Further, in a spindle device of machine tool described in the Patent document 2, a disc-like locking dog is fitted to a rear end of a rod installed movably in the spindle, and a displacement sensor is installed on a cylinder positioned at a rear of the spindle to move the rod, which detects the position of the rod, to thereby determine whether the tool is normally clamped by a collet at a front end of the rod.

[Patent document 1] Japanese Patent Application Laid-Open No. 2003-220504

[Patent document 2] Japanese Patent Application Laid-Open No. H05-050359

SUMMARY OF INVENTION

Problem to be Solved by the Invention

According to the tool-clamping-spring monitoring device in the conventional spindle device of machine tool described in the Patent document 1, the pressure sensor measures the spring force of the disc spring at the time of moving the draw bar in the tool releasing direction by the hydraulic cylinder, to determine the state of the disc spring based on the spring force. However, only by measuring the spring force of the disc spring by the pressure sensor, the point in time when the draw bar has released the tool cannot be ascertained, and therefore the spring force of the disc spring at the time of releasing the tool cannot be measured appropriately, and the state of the disc spring cannot be determined highly accurately.

Further, in the conventional spindle device of machine tool described in the Patent document 2, the displacement sensor detects the position of the rod to determine whether the tool is normally clamped by the collet, and therefore a decrease in the spring force of the disc spring cannot be determined by measuring the tool clamping force by the collet.

The present invention has been achieved to solve the above problems, and an object of the invention is to provide a spindle device of machine tool that can determine a replacement timing of a biasing unit highly accurately by appropriately detecting a tool clamping force.

Means for Solving Problem

According to an aspect of the present invention, a spindle device of machine tool includes a spindle rotatably supported by a housing; a rod movably supported along an axial direction in the spindle; a collet that clamps and unclamps a tool by movement of the rod; a biasing unit that biases the rod in a tool clamping direction by the collet; a drive that presses the rod against a biasing force of the biasing unit to move the tool in an unclamping direction; a rod-pressing-force detecting unit that detects a pressing force to the rod by the drive; a rod-displacement detecting unit that detects displacement of the rod; a tool-clamping-force detecting unit that detects a tool clamping force by the collet based on the pressing force to the rod detected by the rod-pressing-force detecting unit and the displacement of the rod detected by the rod-displacement detecting unit; and a replacement-timing determining unit that determines a replacement timing of the biasing unit based on the tool clamping force detected by the tool-clamping-force detecting unit and a preset biasing force characteristic value of the biasing unit.

Advantageously, in the spindle device of machine tool, the replacement-timing determining unit presumes an actual biasing-force characteristic chart in the biasing unit from the tool clamping force detected by the tool-clamping-force detecting unit based on the biasing-force characteristic chart of the biasing unit, and determines the replacement timing of the biasing unit based on the actual biasing-force characteristic chart.

Advantageously, in the spindle device of machine tool, a display unit is provided, which displays the biasing-force characteristic chart of the biasing unit, indicating a change in the clamping force with respect to a tool clamping frequency by the collet.

According to another aspect of the present invention, a spindle device of machine tool includes a spindle rotatably supported by a housing; a rod movably supported along an axial direction in the spindle; a collet that clamps and unclamps a tool by movement of the rod; a biasing unit that biases the rod in a tool clamping direction by the collet; a drive that presses the rod against a biasing force of the biasing unit to move the tool in an unclamping direction; a rod-pressing-force detecting unit that detects a pressing force to the rod by the drive; a rod-displacement detecting unit that detects displacement of the rod; a tool-clamping-force detecting unit that detects a tool clamping force by the collet based on the pressing force to the rod detected by the rod-pressing-force detecting unit and the displacement of the rod detected by the rod-displacement detecting unit; and a replacement-timing determining unit that determines a replacement timing of the biasing unit based on a change in the tool clamping force with time detected by the tool-clamping-force detecting unit.

Advantageously, in the spindle device of machine tool, the replacement-timing determining unit presumes a biasing-force characteristic chart in the biasing unit based on the change in the tool clamping force with time detected by the tool-clamping-force detecting unit, and determines the replacement timing of the biasing unit based on the biasing-force characteristic chart.

Advantageously, in the spindle device of machine tool, a display unit is provided, which displays the biasing-force characteristic chart of the biasing unit, indicating a change in the clamping force with respect to a tool clamping frequency by the collet.

Advantageously, in the spindle device of machine tool, the tool-clamping-force detecting unit detects a pressing force to the rod detected by the rod-pressing-force detecting unit as the tool clamping force by the collet, when the rod-displacement detecting unit detects the displacement of the rod.

Advantageously, in the spindle device of machine tool, a customer and a manager are connected with each other by a communication line, the pressing force to the rod detected by the rod-pressing-force detecting unit, the displacement of the rod detected by the rod-displacement detecting unit, or the replacement timing of the biasing unit determined by the replacement-timing determining unit is transmitted from the customer to the manager through the communication line, and the manager can caution the customer about the replacement timing of the biasing unit.

Effect of the Invention

According to the spindle device of machine tool, there are provided the rod-pressing-force detecting unit that detects a pressing force of the rod by the drive, the rod-displacement detecting unit that detects displacement of the rod, the tool-clamping-force detecting unit that detects a tool clamping force by the collet based on the pressing force of the rod and the displacement of the rod, and the replacement-timing determining unit that determines a replacement timing of the biasing unit based on the tool clamping force and the preset biasing force characteristic value of the biasing unit. Accordingly, the tool clamping force by the collet can be appropriately detected by using the pressing force of the rod and the displacement of the rod, and deterioration of the biasing unit is presumed by using the tool clamping force and the biasing force characteristic value of the biasing unit, to appropriately determine the replacement timing.

According to the spindle device of machine tool, the replacement-timing determining unit presumes the actual biasing-force characteristic chart in the biasing unit from the tool clamping force based on the biasing-force characteristic chart of the biasing unit, and determines the replacement timing of the biasing unit based on the actual biasing-force characteristic chart. Accordingly, the actual biasing-force characteristic chart is presumed corresponding to the biasing-force characteristic chart of the biasing unit, to determine the replacement timing thereof, thereby enabling highly accurate determination of the replacement timing.

According to the spindle device of machine tool, because the display unit that displays the biasing-force characteristic chart of the biasing unit, indicating a change in the clamping force with respect to the tool clamping frequency by the collet, is provided, an operator can easily ascertain the replacement timing only by confirming the biasing-force characteristic chart of the biasing unit displayed on the display unit.

According to the spindle device of machine tool, there are provided the rod-pressing-force detecting unit that detects a pressing force of the rod by the drive, the rod-displacement detecting unit that detects displacement of the rod, the tool-clamping-force detecting unit that detects a tool clamping force by the collet based on the pressing force of the rod and the displacement of the rod, and the replacement-timing determining unit that determines a replacement timing of the biasing unit based on a change in the tool clamping force with time. Accordingly, the tool clamping force by the collet can be appropriately detected by using the pressing force of the rod and the displacement of the rod, and deterioration of the biasing unit is presumed by using the change in the tool clamping force with time, to appropriately determine the replacement timing.

According to the spindle device of machine tool, the replacement-timing determining unit presumes the biasing-force characteristic chart in the biasing unit based on the change in the tool clamping force with time, to determine the replacement timing of the biasing unit based on the biasing-force characteristic chart. Accordingly, the replacement timing is determined by presuming the biasing-force characteristic chart in the biasing unit based on the change in the tool clamping force with time, thereby enabling highly accurate determination of the replacement timing.

According to the spindle device of machine tool, because the display unit that displays the biasing-force characteristic chart of the biasing unit, indicating a change in the clamping force with respect to the tool clamping frequency by the collet, is provided, an operator can easily ascertain the replacement timing only by confirming the biasing-force characteristic chart of the biasing unit displayed on the display unit.

According to the spindle device of machine tool, the tool-clamping-force detecting unit detects a pressing force of the rod detected by the rod-pressing-force detecting unit as the tool clamping force by the collet, when the rod-displacement detecting unit detects the displacement of the rod. Accordingly, the tool clamping force by the collet can be detected highly accurately by using the pressing force of the rod and the displacement of the rod.

According to the spindle device of machine tool, the customer and the manager are connected with each other by the communication line, the pressing force of the rod, the displacement of the rod, or the replacement timing of the biasing unit is transmitted from the customer to the manager through the communication line, and the manager can caution the customer about the replacement timing of the biasing unit. Accordingly, the manager can ascertain the replacement timing of the biasing unit and caution the customer about the replacement timing thereof, to facilitate preparation of replacement parts, thereby enabling to improve productivity.

EXPLANATIONS OF REFERENCE NUMERALS

11 Housing
15 Spindle
18 Rod
19 Tool
20 Collet
24 Disc spring (Biasing unit)
25 Drive
29 Hydraulic controller (Rod-pressing-force detecting unit)
31 Pressure sensor (Rod-pressing-force detecting unit)
32 Displacement sensor (Rod-displacement detecting unit)
33 Tool clamping-force detector (Tool-clamping-force detecting unit)
34 Determination-result display unit (Display unit)
35 Tool-clamping-force recording unit
36 Spring-replacement-timing determining unit (Replacement-timing determining unit)
37 Tool clamping/unclamping instructing unit
41 Database
42 Spring-replacement-timing determining unit (Replacement-timing determining unit)

DETAILED DESCRIPTION OF THE INVENTION

Exemplary embodiments of a spindle device of machine tool according to the present invention will be explained below in detail with reference to the accompanying drawings. Note that the present invention is not limited thereto.

First Embodiment

Figure 1:
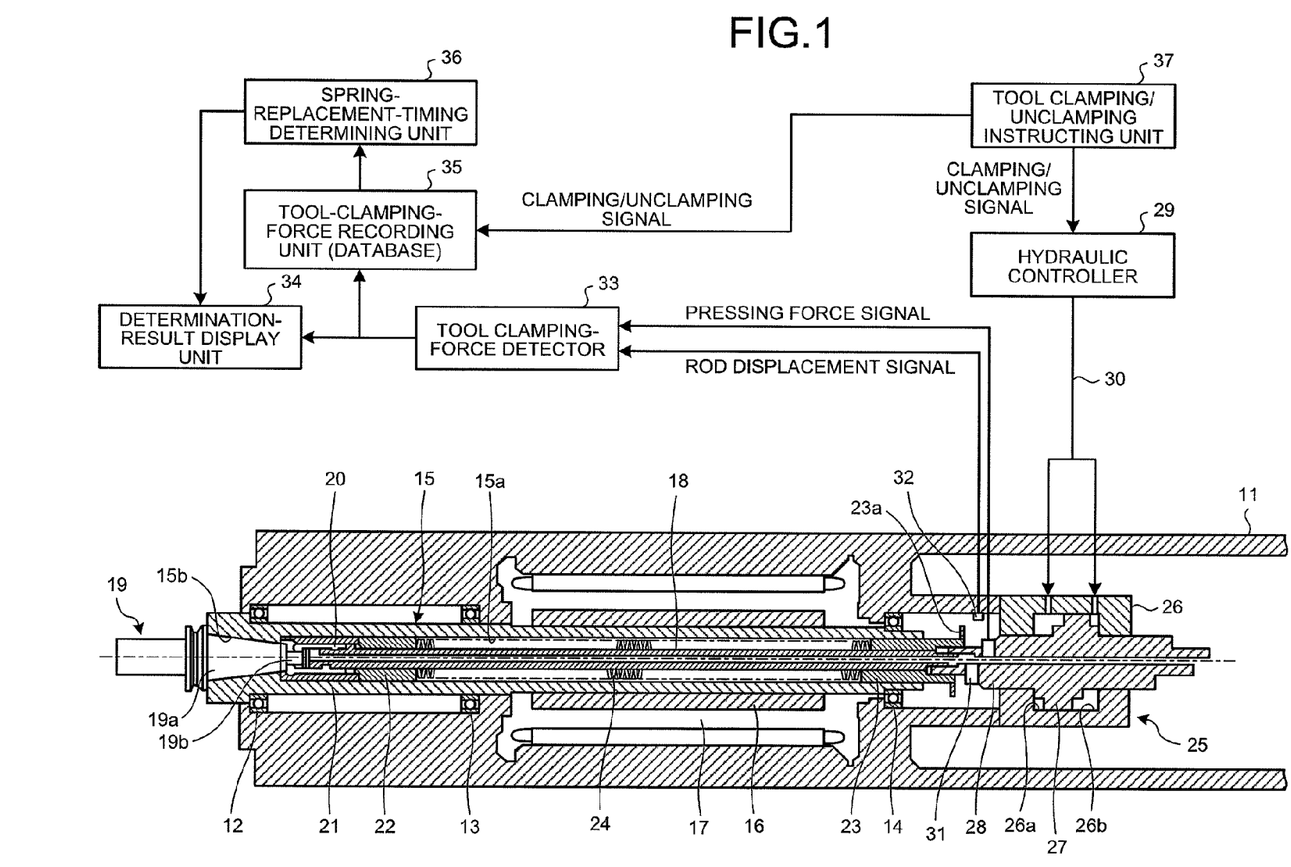
FIG. 1 is a schematic configuration diagram of a spindle device of machine tool according to a first embodiment of the present invention.
Figure 2:
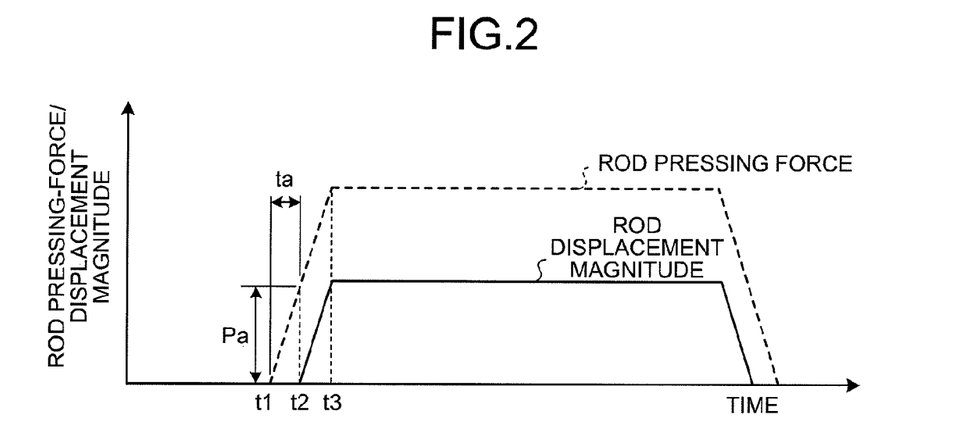
FIG. 2 is a graph representing a pressing force to a rod and a displacement magnitude of a rod in the spindle device of machine tool according to the first embodiment.
Figure 3:
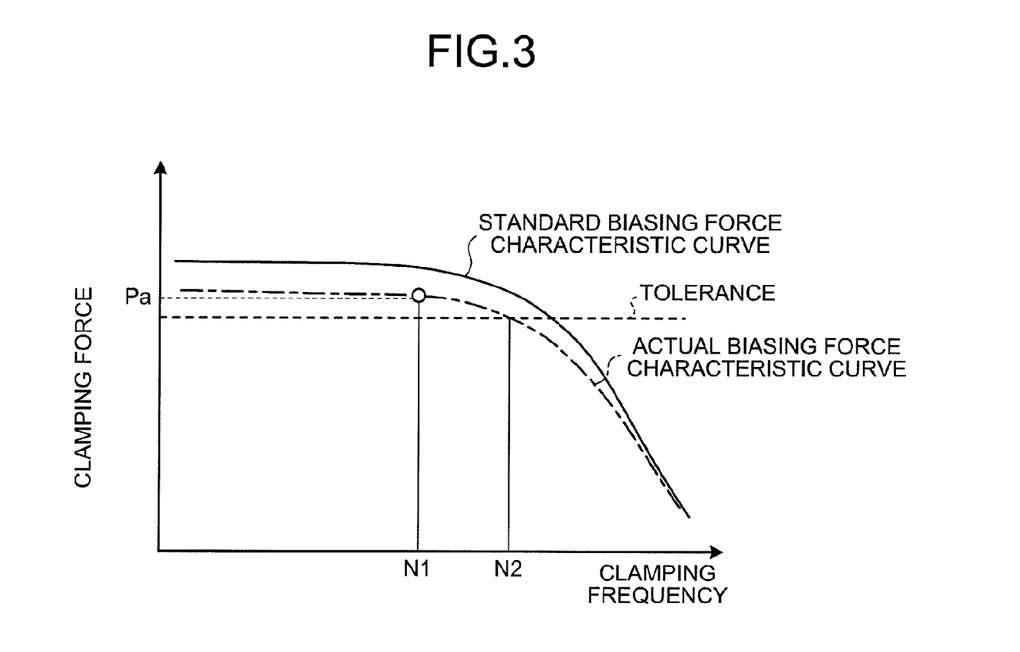
FIG. 3 is a graph representing a clamping force with respect to a tool clamping frequency in the spindle device of machine tool according to the first embodiment.

FIG. 1 is a schematic configuration diagram of a spindle device of machine tool according to a first embodiment of the present invention. FIG. 2 is a graph representing a pressing force and a displacement magnitude of a rod in the spindle device of machine tool according to the first embodiment, and FIG. 3 is a graph representing a clamping force with respect to a tool clamping frequency in the spindle device of machine tool according to the first embodiment.

In the spindle device of machine tool according to the first embodiment, as shown in FIG. 1, a spindle 15 is rotatably supported in a housing 11 by three bearings 12, 13, and 14 arranged in parallel along an axial direction. While a rotor 16 is fixed on an outer circumference of the spindle 15 at an axially intermediate part thereof, a stator 17 is fixed opposite to the rotor 16 in the housing 11, with a predetermined gap therebetween. The rotor 16 and the stator 17 constitute a drive motor that drives and rotates the spindle 15.

In the spindle 15, a hollow part 15a is formed therein along the axial direction, and a tapered hole 15b is formed at one end. A rod 18 is arranged in the hollow part 15a, and a tapered part 19a of a tool 19 is arranged in the tapered hole 15b. A shank segment 19b of the tool 19 extending from the tapered part 19a is positioned in the hollow part 15a, so that a collet 20 mounted at one end of the rod 18 can clamp the shank segment 19b.

A guide member 21 having a cylindrical shape is fitted to one end of the hollow part 15a of the spindle 15, and a sleeve 22 is fitted adjacent to the guide member 21. On the other hand, a sleeve 23 is fixed at the other end of the rod 18, and an outer circumference of the sleeve 23 is movably fitted to the hollow part 15a. In the hollow part 15a of the spindle 15, a plurality of disc springs 24 is installed as a biasing unit between the sleeve 22 and the sleeve 23 in a compressed state.

Therefore, the rod 18 is biased and supported in a direction of clamping the tool 19 by the collet 20 (in FIG. 1, in rightward) via the sleeve 23 due to a biasing force of the disc springs 24. At this time, the collet 20 is restrained inward by the guide member 21, thereby enabling to clamp the shank segment 19b of the tool 19.

Further, in the housing 11, a drive 25 is provided, which presses the rod 18 against the biasing force of the disc springs 24 to move the tool 19 in an unclamping direction. That is, in the drive 25, a cylinder 26 having a hollow shape is fixed in the housing 11, and a piston 27 is fitted in the cylinder 26 to separate two chambers 26a and 26b, and movably supported. A rod 28 integrated with the piston 27 is positioned coaxially with the spindle 15 (the rod 18), and an end face of the sleeve 23 abuts against one end face thereof. A hydraulic controller 29 can supply or discharge hydraulic pressure with respect to the drive 25, and is coupled with a port formed in each chamber 26a and 26b of the cylinder 26 via a hydraulic supply and discharge passage 30.

Therefore, when the hydraulic pressure is supplied to the chamber 26a in the cylinder 26 through the hydraulic supply and discharge passage 30 by the hydraulic controller 29, the piston 27 and the rod 28 move rightward in FIG. 1, and the rod 18 moves rightward while abutting against the sleeve 23 due to the biasing force of the disc springs 24. The tapered part 19a is brought into contact with the tapered hole 15b while the collet 20 clamps the tool 19, so that the tool 19 is firmly clamped by the spindle 15. On the other hand, when the hydraulic pressure is supplied to the chamber 26b of the cylinder 26 through the hydraulic supply and discharge passage 30 by the hydraulic controller 29, the rod 28 resists the biasing force of the disc springs 24 together with the piston 27, and by pressing the rod 18 via the sleeve 23, the rod 18 can be moved in a direction of unclamping the tool 19 by the collet 20 (in FIG. 1, leftward). At this time, the collet 20 moves outward by the guide member 21, thereby enabling to unclamp the shank segment 19b of the tool 19.

In the spindle device of machine tool, because the collet 20 clamps the tool 19 due to the biasing force of the disc springs 24, the biasing force of the disc springs 24 largely affects the machining accuracy by the tool 19. Because a compressing operation and an extension operation act on the disc springs 24 repetitively at the time of replacement of the tool 19, plastic deformation increases slightly, to gradually decrease the biasing force of the disc springs 24. Therefore, to ensure highly accurate machining operation by the tool 19, the biasing force of the disc springs 24 needs to be ascertained, to replace the disc springs 24 at an appropriate timing.

In the spindle device of machine tool in the first embodiment, therefore, a rod-pressing-force detecting unit that detects a pressing force to the rod 18 by the drive 25, a rod-displacement detecting unit that detects displacement of the rod 18, a tool-clamping-force detecting unit that detects a clamping force to the tool 19 by the collet 20 based on the detected pressing force to the rod 18 and displacement of the rod 18, and a replacement-timing determining unit that determines a replacement timing of the disc springs 24 based on the detected clamping force to the tool 19 and a preset biasing force characteristic value of the disc springs 24 are provided.

That is, as the rod-pressing-force detecting unit, a pressure sensor 31 is provided at the end of the rod 18 of the drive 25, which can be clamped between the other end of the rod 18 of the spindle 15 and the end of the rod 18 of the drive 25. A ring part 23a having a disc shape is integrally formed with the sleeve 23 of the rod 18, and a displacement sensor 32 that detects the ring part 23a is provided in the housing 11, as the rod-displacement detecting unit. In this case, the displacement sensor 32 can be a proximity sensor, and needs only to detect the movement of the rod 18.

A tool clamping-force detector (tool-clamping-force detecting unit) 33 detects a clamping force to the tool 19 corresponding to the biasing force of the disc springs 24 based on a pressing force signal detected by the pressure sensor 31 and a rod displacement signal detected by the displacement sensor 32. The tool clamping-force detector is connected to a determination-result display unit (display unit) 34 and a tool-clamping-force recording unit (database) 35. The determination-result display unit 34 displays the clamping force to the tool 19 detected by the tool clamping-force detector 33, for example, on a display, and the tool-clamping-force recording unit 35 stores the clamping force to the tool 19 detected by the tool clamping-force detector 33.

A spring-replacement-timing determining unit (replacement-timing determining unit) 36 determines a replacement timing of the disc springs 24 based on the clamping force to the tool 19 and the preset biasing force characteristic value of the disc springs 24 and displays the replacement timing on the determination-result display unit 34.

A tool clamping/unclamping instructing unit 37 outputs a tool clamping signal or a tool unclamping signal to the hydraulic controller 29, based on a control signal of an unillustrated NC controller. The tool clamping signal or the tool unclamping signal is also output to the tool-clamping-force recording unit 35.

A specific process performed by the tool clamping-force detector 33 and the spring-replacement-timing determining unit 36 is explained here.

As shown in FIG. 1, when the spindle 15 is in a state of clamping the tool 19 by clamping the shank segment 19b of the tool 19 by the collet 20 of the rod 18, the tool clamping/unclamping instructing unit 37 outputs a tool unclamping signal to the hydraulic controller 29 and the tool-clamping-force recording unit 35. The hydraulic controller 29 supplies the hydraulic pressure to the chamber 26b of the cylinder 26 in the drive 25 through the hydraulic supply and discharge passage 30, and the rod 28 integrated with the piston 27 presses the rod 18 against the biasing force of the disc springs 24 to move the rod 18. Because the rod 18 moves, the collet 20 moves outward by the guide member 21, to unclamp the shank segment 19b of the tool 19.

At this time, as shown in FIG. 2, the drive 25 is operated at time t1 by the hydraulic controller 29, and when the rod 28 starts to press the rod 18 of the spindle 15, although the pressing force thereof increases, the biasing force of the disc springs 24 is larger than the pressing force, and therefore the rod 18 is not displaced. When the pressing force to the rod 18 by the drive 25 increases, and at time t2, when the pressing force of the rod 28 of the drive 25 to the rod 18 of the spindle 15 exceeds the biasing force of the disc springs 24, the rod 18 starts to be displaced, and the collet 20 unclamps the shank segment 19b of the tool 19. When the pressing force of the drive 25 increases to move the rod 18 further, then at time t3, the collet 20 completely unclamps the shank segment 19b of the tool 19 due to the movement of the rod 18, thereby enabling to replace the tool 19.

Therefore, the pressure sensor 31 always detects the pressing force to the rod 18 at this time, and the displacement sensor 32 always detects the displacement of the rod 18. Time to from time t1 to t2 shown in FIG. 2 is a clamping force cancel range (time) by the disc springs 24, and the pressing force at this time is a tool clamping force Pa. That is, the pressing force that acts since the drive 25 has started to press the rod 18 of the spindle 15 (the time t1) until the rod 18 starts to be displaced (the time t2) can be presumed as the tool clamping force by the disc springs 24.

As shown in FIG. 3, the spring-replacement-timing determining unit 36 stores a standard biasing force characteristic curve (biasing force characteristic value) in the disc springs 24 determined beforehand based on experiments. The spring-replacement-timing determining unit 36 sets an actual biasing-force characteristic chart by modifying the standard biasing force characteristic curve based on the clamping force Pa at the time of a predetermined clamping frequency N1 detected according to the above method, that is, by multiplying the standard biasing force characteristic curve by a coefficient. A tolerance of the clamping force by the disc springs 24 is preset, and the replacement timing of the disc springs 24 is at a clamping frequency N2 at a node between the actual biasing force characteristic curve and the tolerance of the clamping force. In this case, the tool-clamping-force recording unit 35 calculates the clamping frequency in the past and the clamping frequency per day, and can calculate usable remaining number of days based on the clamping frequency N2 corresponding to the replacement timing.

Thus, in the spindle device of machine tool according to the first embodiment, the pressure sensor 31 that detects the pressing force to the rod 18 by the drive 25, the displacement sensor 32 that detects displacement of the rod 18, the tool clamping-force detector 33 that detects the clamping force to the tool 19 by the collet 20 based on the pressing force to the rod 18 and the displacement of the rod 18, and the spring-replacement-timing determining unit 36 that determines the replacement timing of the disc springs 24 based on the tool clamping force and the preset biasing force characteristic value of the disc springs 24 are provided.

Therefore, the clamping force to the tool 19 by the collet 20 can be appropriately detected by using the pressing force to the rod 18 and the displacement of the rod 18, and deterioration of the disc springs 24 can be presumed by using the clamping force to the tool 19 and the biasing force characteristic value of the disc springs 24, to determine the replacement timing highly accurately. As a result, parts can be ordered and production processes can be set, matched with the replacement timing of the disc springs 24, to thereby improve the production efficiency.

In this case, in the spindle device of machine tool according to the first embodiment, the spring-replacement-timing determining unit 36 presumes the actual biasing force characteristic curve in the disc springs 24 from the detected clamping force to the tool 19 based on the standard biasing force characteristic curve of the disc springs 24, to determine the replacement timing of the disc springs 24 based on the actual biasing force characteristic curve. Therefore, the actual biasing force characteristic curve is presumed according to the standard biasing force characteristic curve of the disc springs 24, to determine the replacement timing of the disc springs 24, and therefore the replacement timing can be determined simply and highly accurately.

Further, the determination-result display unit 34 that displays the biasing-force characteristic chart of the disc springs 24, which indicates a change in the clamping force with respect to the clamping frequency of the tool 19 by the collet 20, is provided. The operator can ascertain the replacement timing easily only by confirming the biasing-force characteristic chart of the disc springs 24 displayed on the determination-result display unit 34.

Further, in the spindle device of machine tool according to the first embodiment, the tool clamping-force detector 33 detects the pressing force to the rod 18 detected by the pressure sensor 31 when the displacement sensor 32 detects the displacement of the rod 18 as the clamping force to the tool 19 by the collet 20, and by using the pressing force to the rod 18 and the displacement of the rod 18, the clamping force to the tool 19 by the collet 20 can be detected highly accurately.

Second Embodiment

Figure 4:
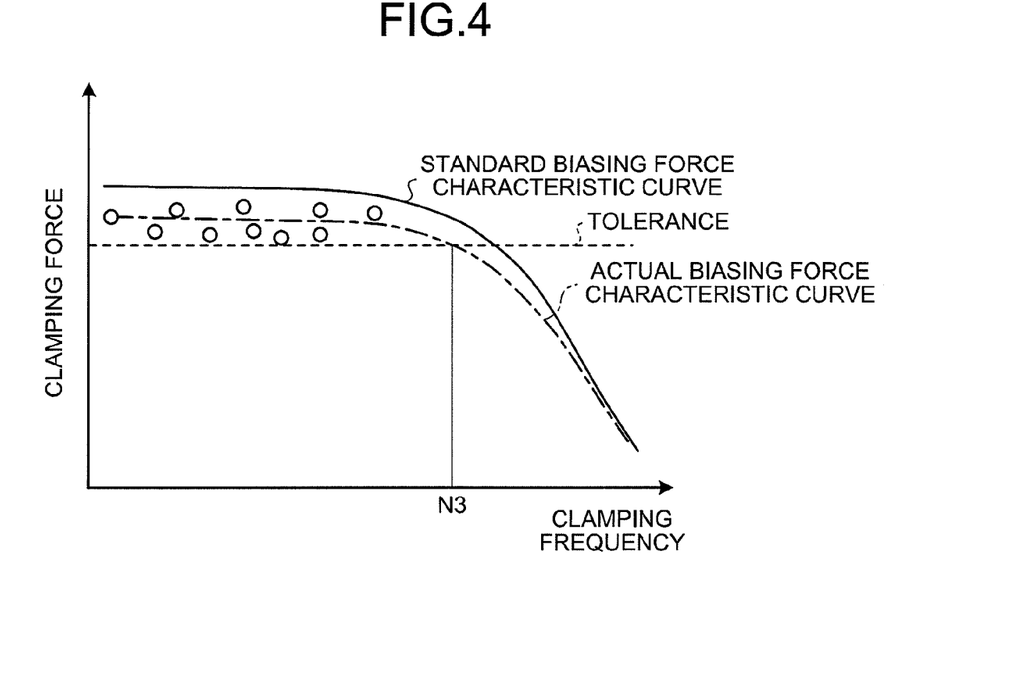
FIG. 4 is a graph representing a clamping force with respect to a tool clamping frequency in a spindle device of machine tool according to a second embodiment of the present invention.

FIG. 4 is a graph representing a clamping force with respect to a tool clamping frequency in a spindle device of machine tool according to a second embodiment of the present invention. The overall configuration in the spindle device of machine tool according to the second embodiment is substantially the same as that of the first embodiment. Therefore, the second embodiment is explained with reference to FIG. 1, like reference letters or numerals are denoted to like parts having the same functions as those explained in the first embodiment, and explanations thereof will be omitted.

In the spindle device of machine tool according to the second embodiment, as shown in FIG. 1, the pressure sensor 31 that detects the pressing force to the rod 18 by the drive 25, the displacement sensor 32 that detects displacement of the rod 18, the tool clamping-force detector 33 that detects the clamping force to the tool 19 by the collet 20 based on the detected pressing force to the rod 18 and displacement of the rod 18, and the spring-replacement-timing determining unit 36 that determines the replacement timing of the disc springs 24 based on the detected clamping force to the tool 19 and the preset standard biasing force characteristic curve (value) of the disc springs 24 are provided.

Therefore, the hydraulic pressure is supplied to the chamber 26b of the cylinder 26 in the drive 25 from the hydraulic controller 29, to press the rod 18 against the biasing force of the disc springs 24 by the rod 28 integrated with the piston 27 to thereby move the rod 18. Because the rod 18 is moved, the collet 20 moves outward by the guide member 21, to unclamp the shank segment 19b of the tool 19.

At this time, the tool clamping-force detector 33 detects the pressing force that acts since the drive 25 has started to press the rod 18 of the spindle 15 until the rod 18 starts to be displaced as the tool clamping force by the disc springs 24, based on detection results of the pressure sensor 31 and the displacement sensor 32. As shown in FIG. 4, the spring-replacement-timing determining unit 36 stores the standard biasing force characteristic curve in the disc springs 24 determined beforehand based on experiments. The spring-replacement-timing determining unit 36 sets the actual biasing-force characteristic chart by modifying the standard biasing force characteristic curve based on a plurality of clamping forces at the time of predetermined clamping frequency. The tolerance of the clamping force by the disc springs 24 is preset, and the replacement timing of the disc springs 24 is at a clamping frequency N3 at a node between the actual biasing force characteristic curve and the tolerance of the clamping force. In this case, the tool-clamping-force recording unit 35 calculates the clamping frequency in the past and the clamping frequency per day, and can calculate usable remaining number of days based on the clamping frequency N3 corresponding to the replacement timing.

Thus, in the spindle device of machine tool according to the second embodiment, the pressure sensor 31 that detects the pressing force to the rod 18 by the drive 25, the displacement sensor 32 that detects displacement of the rod 18, the tool clamping-force detector 33 that detects the clamping force to the tool 19 by the collet 20 based on the pressing force to the rod 18 and the displacement of the rod 18, and the spring-replacement-timing determining unit 36 that determines the replacement timing of the disc springs 24 based on a plurality of tool clamping forces at different clamping frequencies and the preset standard biasing force characteristic curve of the disc springs 24 are provided.

Therefore, the clamping force to the tool 19 by the collet 20 can be appropriately detected by using the pressing force to the rod 18 and the displacement of the rod 18, and a highly accurate actual biasing force characteristic curve can be formed by using the clamping forces to the tool 19 at the different clamping frequencies and the standard biasing force characteristic value of the disc springs 24, to appropriately presume deterioration of the disc springs 24, thereby enabling to determine the replacement timing thereof highly accurately.

Third Embodiment

Figure 5:
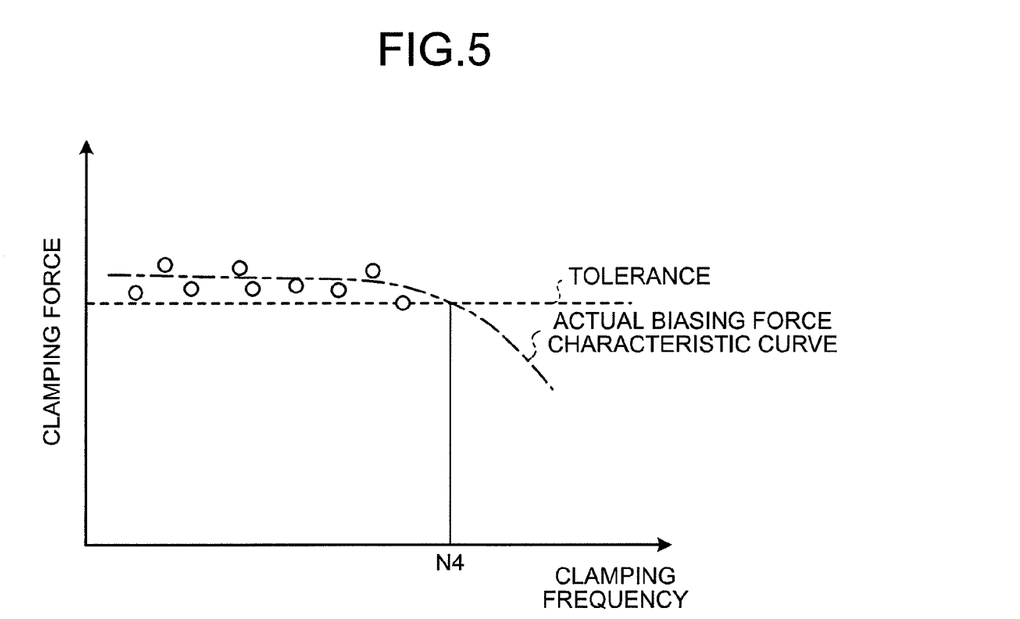
FIG. 5 is a graph representing a clamping force with respect to a tool clamping frequency in a spindle device of machine tool according to a third embodiment of the present invention.

FIG. 5 is a graph representing a clamping force with respect to a tool clamping frequency in a spindle device of machine tool according to a third embodiment of the present invention. The overall configuration in the spindle device of machine tool according to the third embodiment is substantially the same as that of the first embodiment. Therefore, the third embodiment is explained with reference to FIG. 1, like reference letters or numerals are denoted to like parts having the same functions as those explained in the first embodiment, and explanations thereof will be omitted.

In the spindle device of machine tool according to the third embodiment, as shown in FIG. 1, the pressure sensor 31 that detects the pressing force to the rod 18 by the drive 25, the displacement sensor 32 that detects displacement of the rod 18, the tool clamping-force detector 33 that detects the clamping force to the tool 19 by the collet 20 based on the detected pressing force to the rod 18 and displacement of the rod 18, and the spring-replacement-timing determining unit 36 that determines the replacement timing of the disc springs 24 based on the detected clamping force to the tool 19 and the preset standard biasing force characteristic curve (value) of the disc springs 24 are provided.

Therefore, the hydraulic pressure is supplied to the chamber 26b of the cylinder 26 in the drive 25 from the hydraulic controller 29, to press the rod 18 against the biasing force of the disc springs 24 by the rod 28 integrated with the piston 27 to thereby move the rod 18. Because the rod 18 is moved, the collet 20 moves outward by the guide member 21, to unclamp the shank segment 19b of the tool 19.

At this time, the tool clamping-force detector 33 detects the pressing force that acts since the drive 25 has started to press the rod 18 of the spindle 15 until the rod 18 starts to be displaced as the tool clamping force by the disc springs 24, based on the detection results of the pressure sensor 31 and the displacement sensor 32. As shown in FIG. 4, the spring-replacement-timing determining unit 36 sets the actual biasing-force characteristic chart based on the clamping forces at a predetermined clamping frequency. In this case, a highly accurate actual biasing-force characteristic chart can be set by storing the clamping frequency—the clamping force in a database. Further, when the actual biasing-force characteristic chart is set from a plurality of clamping forces, a method of least squares can be used. The tolerance of the clamping force by the disc springs 24 is preset, and the replacement timing of the disc springs 24 is at a clamping frequency N4 at a node between the actual biasing force characteristic curve and the tolerance of the clamping force. In this case, the tool-clamping-force recording unit 35 calculates the clamping frequency in the past and the clamping frequency per day, and can calculate usable remaining number of days based on the clamping frequency N2 corresponding to the replacement timing.

Thus, in the spindle device of machine tool according to the third embodiment, the pressure sensor 31 that detects the pressing force to the rod 18 by the drive 25, the displacement sensor 32 that detects displacement of the rod 18, the tool clamping-force detector 33 that detects the clamping force to the tool 19 by the collet 20 based on the pressing force to the rod 18 and the displacement of the rod 18, and the spring-replacement-timing determining unit 36 that determines the replacement timing of the disc springs 24 based on a plurality of tool clamping forces at different clamping frequencies are provided.

Therefore, the clamping force to the tool 19 by the collet 20 can be appropriately detected by using the pressing force to the rod 18 and the displacement of the rod 18, and a highly accurate actual biasing force characteristic curve can be formed by using the clamping forces to the tool 19 at the different clamping frequencies, to appropriately presume deterioration of the disc springs 24, thereby enabling to determine the replacement timing thereof highly accurately.

Fourth Embodiment

Figure 6:
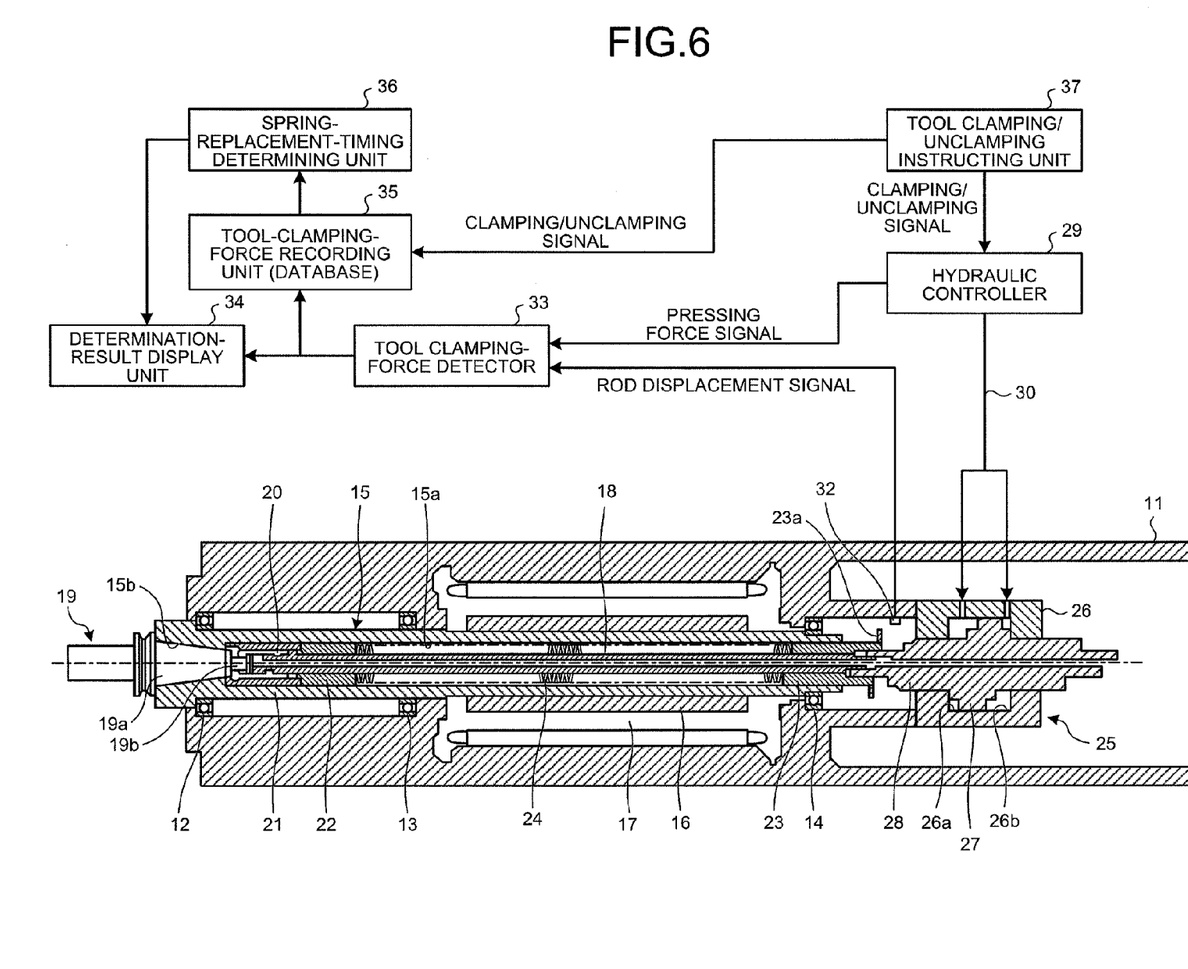
FIG. 6 is a schematic configuration diagram of a spindle device of machine tool according to a fourth embodiment of the present invention.

FIG. 6 is a schematic configuration diagram of a spindle device of machine tool according to a fourth embodiment of the present invention. Like reference letters or numerals are denoted to like parts having the same functions as those explained in the above embodiments, and explanations thereof will be omitted.

In the spindle device of machine tool according to the fourth embodiment, as shown in FIG. 1, the hydraulic controller 29 that sets the pressing force to the rod 18 by the drive 25, the displacement sensor 32 that detects displacement of the rod 18, the tool clamping-force detector 33 that detects the clamping force to the tool 19 by the collet 20 based on the set pressing force to the rod 18 and the displacement of the rod 18, and the spring-replacement-timing determining unit 36 that determines a replacement timing of the disc springs 24 based on the detected claming force to the tool 19 and the preset standard biasing force characteristic curve (value) of the disc springs 24 are provided.

Accordingly, the tool clamping/unclamping instructing unit 37 outputs a tool unclamping signal to the hydraulic controller 29 and the tool-clamping-force recording unit 35. The hydraulic controller 29 supplies the hydraulic pressure to the chamber 26b of the cylinder 26 in the drive 25 via the hydraulic supply and discharge passage 30, and the rod 28 integrated with the piston 27 presses the rod 18 against the biasing force of the disc springs 24 to move the rod 18. Because the rod 18 moves, the collet 20 moves outward by the guide member 21, to unclamp the shank segment 19b of the tool 19.

At this time, the tool clamping-force detector 33 detects the pressing force that acts since the drive 25 has started to press the rod 18 of the spindle 15 until the rod 18 starts to be displaced as the tool clamping force by the disc springs 24, based on a pressing force signal by the hydraulic controller 29 and the detection signal of the displacement sensor 32. The spring-replacement-timing determining unit 36 determines the replacement timing of the disc springs 24 based on the detected claming force. Because the determination method of the replacement timing of the disc springs 24 has been explained in detail in the above respective embodiments, explanations thereof will be omitted here.

Thus, in the spindle device of machine tool in the fourth embodiment, the hydraulic controller 29 that sets the pressing force to the rod 18 by the drive 25, the displacement sensor 32 that detects displacement of the rod 18, the tool clamping-force detector 33 that detects the clamping force to the tool 19 by the collet 20 based on the pressing force to the rod 18 and the displacement of the rod 18, and the spring-replacement-timing determining unit 36 that determines a replacement timing of the disc springs 24 based on the tool claming force and the preset biasing force characteristic value of the disc springs 24 are provided.

Therefore, the clamping force to the tool 19 by the collet 20 can be appropriately detected by using a command value by the hydraulic controller 29 and a detection value of the displacement sensor 32, and deterioration of the disc springs 24 is presumed by using the clamping force to the tool 19 and the biasing force characteristic value of the disc springs 24, to determine the replacement timing thereof highly accurately. Because the pressure sensor is not required, the structure can be simplified and low cost can be realized.

Fifth Embodiment

Figure 7:
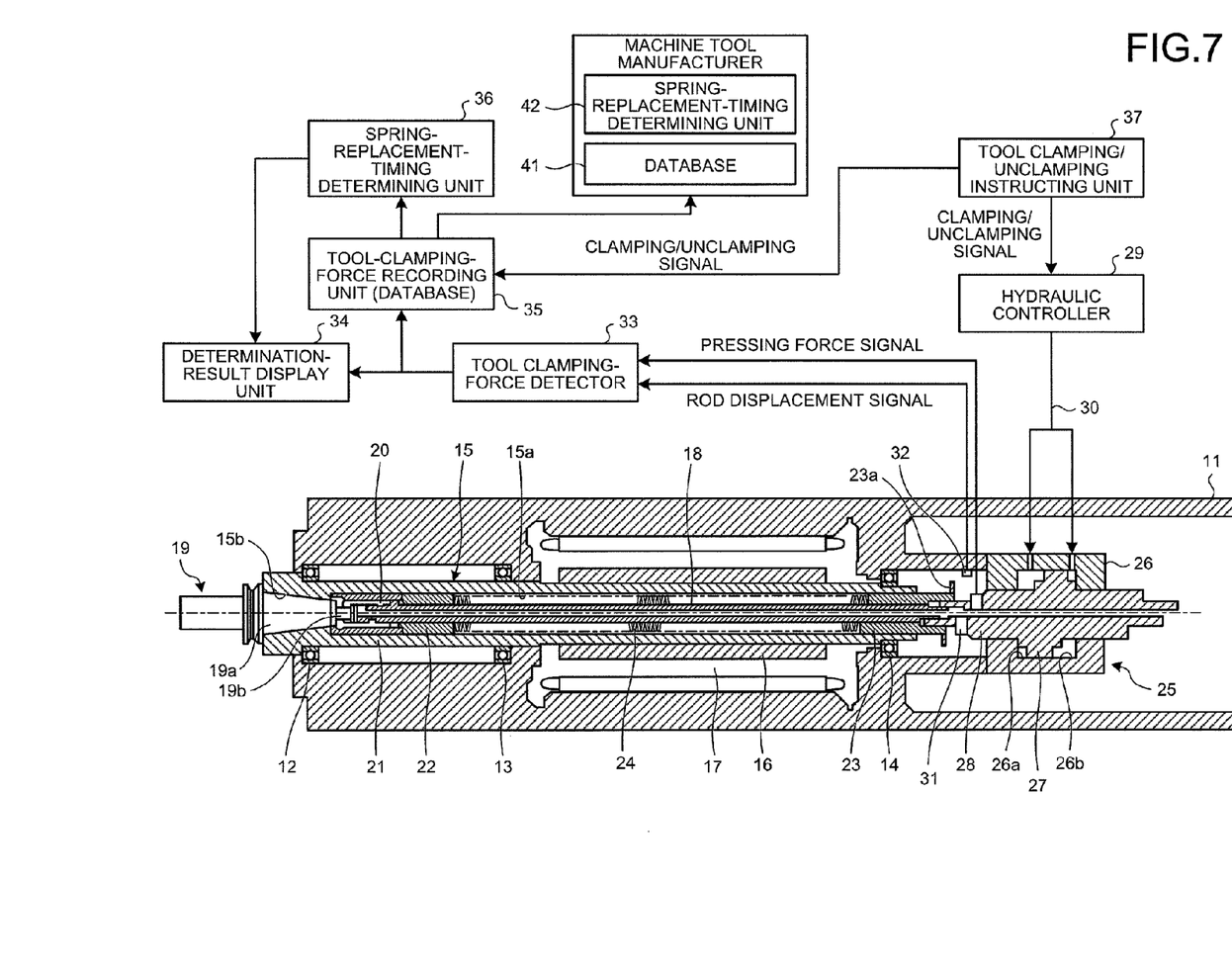
FIG. 7 is a schematic configuration diagram of a spindle device of machine tool according to a fifth embodiment of the present invention.

FIG. 7 is a schematic configuration diagram of a spindle device of machine tool according to a fifth embodiment of the present invention. Like reference letters or numerals are denoted to like parts having the same functions as those explained in the above embodiments, and explanations thereof will be omitted.

In the spindle device of machine tool according to the fifth embodiment, as shown in FIG. 7, the pressure sensor 31 that detects the pressing force to the rod 18 by the drive 25, the displacement sensor 32 that detects the displacement of the rod 18, the tool clamping-force detector 33 that detects the clamping force to the tool 19 by the collet 20 based on the detected pressing force to the rod 18 and displacement of the rod 18, the determination-result display unit 34 that displays the clamping force to the tool 19 detected by the tool clamping-force detector 33, the tool-clamping-force recording unit 35 that stores the clamping force to the tool 19, and the spring-replacement-timing determining unit 36 that determines the replacement timing of the disc springs 24 based on the detected claming force to the tool 19 are provided.

Further, a customer who uses the spindle device of machine tool and a manufacturer (manager) who manufactures and manages the spindle device of machine tool are connected with each other by a communication line. The manufacturer includes a database 41 and a spring-replacement-timing determining unit 42. Accordingly, the clamping force to the tool 19 by the collet 20 detected by the tool clamping-force detector 33 is transmitted from the customer's database 41 to the manufacturer's database 41 via the communication line, and the spring-replacement-timing determining unit 42 can determine the replacement timing of the disc springs 24 based on the received clamping force to the tool 19.

Therefore, the hydraulic controller 29 supplies the hydraulic pressure to the chamber 26b of the cylinder 26 in the drive 25, and the rod 28 integrated with the piston 27 presses the rod 18 against the biasing force of the disc springs 24 to move the rod 18. Because the rod 18 moves, the collet 20 moves outward by the guide member 21, to unclamp the shank segment 19b of the tool 19.

At this time, the tool clamping-force detector 33 detects the pressing force that acts since the drive 25 has started to press the rod 18 of the spindle 15 until the rod 18 starts to be displaced as the tool clamping force by the disc springs 24, based on the detection results of the pressure sensor 31 and the displacement sensor 32. The determination-result display unit 34 displays the clamping force to the tool 19 detected by the tool clamping-force detector 33 and the tool-clamping-force recording unit 35 stores the clamping force to the tool 19. The spring-replacement-timing determining unit 36 determines the replacement timing of the disc springs 24 based on the detected claming force.

The clamping force to the tool 19 by the collet 20 detected by the tool clamping-force detector 33 is transmitted from the customer's database 41 to the manufacturer's database 41 via the communication line. The spring-replacement-timing determining unit 42 determines the replacement timing of the disc springs 24 based on the received clamping force to the tool 19. Therefore, the customer and the manufacturer can ascertain the replacement timing of the disc springs 24 simultaneously.

Because the determination method of the replacement timing of the disc springs 24 based on the clamping force by the spring-replacement-timing determining units 36 and 42 has been explained in detail in the above respective embodiments, explanations thereof will be omitted.

Thus, in the spindle device of machine tool in the fifth embodiment, the pressure sensor 31 that detects the pressing force to the rod 18 by the drive 25, the displacement sensor 32 that detects displacement of the rod 18, the tool clamping-force detector 33 that detects the clamping force to the tool 19 by the collet 20 based on the pressing force to the rod 18 and the displacement of the rod 18, and the spring-replacement-timing determining unit 36 that determines the replacement timing of the disc springs 24 based on the tool claming force are provided. The customer who uses the spindle device of machine tool and the manufacturer who manufactures and manages the spindle device of machine tool are connected with each other via the communication line, and the database 41 and the spring-replacement-timing determining unit 42 are provided on the manufacturer side.

Therefore, the clamping force to the tool 19 by the collet 20 can be detected by using the pressing force to the rod 18 and the displacement of the rod 18, and the customer can determine the replacement timing of the disc springs 24 based on the clamping force to the tool 19. The manufacturer side can also determine the replacement timing of the disc springs 24 based on the clamping force to the tool 19. Accordingly, parts can be ordered and production processes can be set, matched with the replacement timing of the disc springs 24, to thereby improve the production efficiency.

Sixth Embodiment

Figure 8:
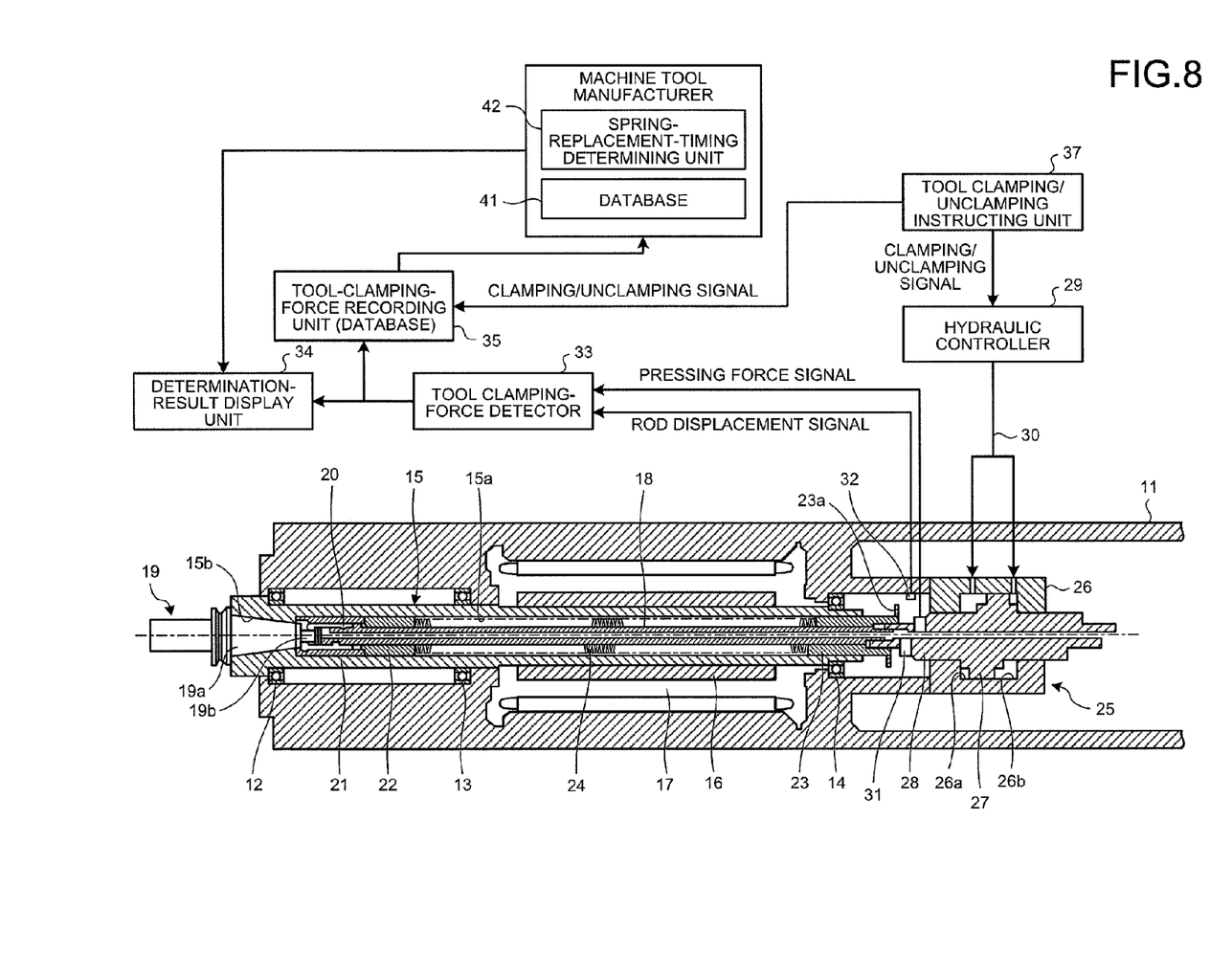
FIG. 8 is a schematic configuration diagram of a spindle device of machine tool according to a sixth embodiment of the present invention.

FIG. 8 is a schematic configuration diagram of a spindle device of machine tool according to a sixth embodiment of the present invention. Like reference letters or numerals are denoted to like parts having the same functions as those explained in the above embodiments, and explanations thereof will be omitted.

In the spindle device of machine tool according to the sixth embodiment, as shown in FIG. 7, the pressure sensor 31 that detects the pressing force to the rod 18 by the drive 25, the displacement sensor 32 that detects the displacement of the rod 18, the tool clamping-force detector 33 that detects the clamping force to the tool 19 by the collet 20 based on the detected pressing force to the rod 18 and displacement of the rod 18, the determination-result display unit 34 that displays the clamping force to the tool 19 detected by the tool clamping-force detector 33, and the tool-clamping-force recording unit 35 that stores the clamping force to the tool 19 are provided.

Further, the customer who uses the spindle device of machine tool and the manufacturer (manager) who manufactures and manages the spindle device of machine tool are connected with each other by the communication line. The manufacturer includes the database 41 and the spring-replacement-timing determining unit 42. Accordingly, the clamping force to the tool 19 by the collet 20 detected by the tool clamping-force detector 33 is transmitted from the customer's database 41 to the manufacturer's database 41 via the communication line, and the spring-replacement-timing determining unit 42 can determine the replacement timing of the disc springs 24 based on the received clamping force to the tool 19.

Therefore, the hydraulic controller 29 supplies the hydraulic pressure to the chamber 26b of the cylinder 26 in the drive 25, and the rod 28 integrated with the piston 27 presses the rod 18 against the biasing force of the disc springs 24 to move the rod 18. Because the rod 18 moves, the collet 20 moves outward by the guide member 21, to unclamp the shank segment 19b of the tool 19.

At this time, the tool clamping-force detector 33 detects the pressing force that acts since the drive 25 has started to press the rod 18 of the spindle 15 until the rod 18 starts to be displaced as the tool clamping force by the disc springs 24, based on the detection results of the pressure sensor 31 and the displacement sensor 32. The determination-result display unit 34 displays the clamping force to the tool 19 detected by the tool clamping-force detector 33 and the tool-clamping-force recording unit 35 stores the clamping force to the tool 19.

The clamping force to the tool 19 by the collet 20 detected by the tool clamping-force detector 33 is then transmitted from the customer's database 41 to the manufacturer's database 41 via the communication line, and the spring-replacement-timing determining unit 42 determines the replacement timing of the disc springs 24 based on the received clamping force to the tool 19. The manufacturer transmits the replacement timing of the disc springs 24 determined by the spring-replacement-timing determining unit 42 to the customer's determination-result display unit 34 through the communication line, and the determination-result display unit 34 displays the replacement timing of the disc springs 24 to caution the customer about the replacement timing.

Thus, in the spindle device of machine tool in the sixth embodiment, the pressure sensor 31 that detects the pressing force to the rod 18 by the drive 25, the displacement sensor 32 that detects displacement of the rod 18, and the tool clamping-force detector 33 that detects the clamping force to the tool 19 by the collet 20 based on the pressing force to the rod 18 and the displacement of the rod 18 are provided. Further, the customer who uses the spindle device of machine tool and the manufacturer who manufactures and manages the spindle device of machine tool are connected with each other by the communication line. The manufacturer includes the database 41 and the spring-replacement-timing determining unit 42.

Therefore, the clamping force to the tool 19 by the collet 20 can be detected by using the pressing force to the rod 18 and the displacement of the rod 18, and the customer transmits the tool clamping force to the manufacturer. The manufacturer determines the replacement timing of the disc springs 24 based on the clamping force to the tool 19, and transmits the determination result to the customer to caution the customer about the replacement timing. The manufacturer side can also determine the replacement timing of the disc springs 24 based on the clamping force to the tool 19, and can prepare the parts and set the production processes, matched with the replacement timing of the disc springs 24, to thereby improve the production efficiency.

In the fifth and sixth embodiments, the clamping force to the tool 19 by the collet 20 detected by the tool clamping-force detector 33 is transmitted from the customer's database 41 to the manufacturer's database 41 through the communication line. However, the pressing force to the rod 18 detected by the pressure sensor 31 and the displacement of the rod 18 detected by the displacement sensor 32 can be transmitted, or the replacement timing of the disc springs 24 determined by the spring-replacement-timing determining unit 36 can be transmitted.

INDUSTRIAL APPLICABILITY

The spindle device of machine tool according to the present invention can detect the tool clamping force based on the pressing force to the rod and the displacement of the rod, to determine the replacement timing of the biasing unit based on the tool clamping force, and can be applied to any machine tool.

The invention claimed is:

1. A spindle device of machine tool comprising:
   a spindle rotatably supported by a housing;
   a rod movably supported along an axial direction in the spindle;
   a collet that clamps and unclamps a tool by movement of the rod;
   a biasing unit that biases the rod in a tool clamping direction by the collet;
   a drive that presses the rod against a biasing force of the biasing unit to move the tool in an unclamping direction;
   a rod-pressing-force detecting unit that detects a pressing force to the rod by the drive;
   a rod-displacement detecting unit that detects displacement of the rod;
   a tool-clamping-force detecting unit that detects a tool clamping force by the collet based on the pressing force to the rod detected by the rod-pressing-force detecting unit and the displacement of the rod detected by the rod-displacement detecting unit, the tool clamping force being determined by detecting, by the rod-pressing-force detecting unit, the pressing force at a time when the rod-displacement detecting unit detects that the rod has started to be displaced; and
   a replacement-timing determining unit that determines a replacement timing of the biasing unit based on the tool clamping force detected by the tool-clamping-force detecting unit and a preset biasing force characteristic value of the biasing unit.

2. The spindle device of machine tool according to claim 1, wherein the replacement-timing determining unit presumes an actual biasing-force characteristic chart in the biasing unit from the tool clamping force detected by the tool-clamping-force detecting unit based on the biasing-force characteristic chart of the biasing unit, and determines the replacement timing of the biasing unit based on the actual biasing-force characteristic chart.

3. The spindle device of machine tool according to claim 2, wherein a display unit is provided, which displays the biasing-force characteristic chart of the biasing unit, indicating a change in the clamping force with respect to a tool clamping frequency by the collet.

4. The spindle device of machine tool according to claim 1, wherein the tool-clamping-force detecting unit detects a pressing force to the rod detected by the rod-pressing-force detecting unit as the tool clamping force by the collet, when the rod-displacement detecting unit detects the displacement of the rod.

5. The spindle device of machine tool according to claim 1, wherein a customer and a manager are connected with each other by a communication line, the pressing force to the rod detected by the rod-pressing-force detecting unit, the displacement of the rod detected by the rod-displacement detecting unit, or the replacement timing of the biasing unit determined by the replacement-timing determining unit is transmitted from the customer to the manager through the communication line, and the manager can caution the customer about the replacement timing of the biasing unit.

6. The spindle device of machine tool according to claim 1, wherein the rod-pressing-force detecting unit continuously detects the pressing force at least from a time when an operation of the drive has been initiated.

7. The spindle device of machine tool according to claim 1, wherein the rod-displacement-detecting unit continuously detects the displacement of the rod at least from a time when an operation of the drive has been initiated.

8. A spindle device of machine tool comprising:
   a spindle rotatably supported by a housing;
   a rod movably supported along an axial direction in the spindle;
   a collet that clamps and unclamps a tool by movement of the rod;
   a biasing unit that biases the rod in a tool clamping direction by the collet;
   a drive that presses the rod against a biasing force of the biasing unit to move the tool in an unclamping direction;
   a rod-pressing-force detecting unit that detects a pressing force to the rod by the drive;
   a rod-displacement detecting unit that detects displacement of the rod;
   a tool-clamping-force detecting unit that detects a tool clamping force by the collet based on the pressing force to the rod detected by the rod-pressing-force detecting unit and the displacement of the rod detected by the rod-displacement detecting unit, the tool clamping force being determined by detecting, by the rod-pressing-force detecting unit, the pressing force at a time when the rod-displacement detecting unit detects that the rod has started to be displaced; and
   a replacement-timing determining unit that determines a replacement timing of the biasing unit based on a change in the tool clamping force with time detected by the tool-clamping-force detecting unit.

9. The spindle device of machine tool according to claim 8, wherein the replacement-timing determining unit presumes a biasing-force characteristic chart in the biasing unit based on the change in the tool clamping force with time detected by the tool-clamping-force detecting unit, and determines the replacement timing of the biasing unit based on the biasing-force characteristic chart.

10. The spindle device of machine tool according to claim 9, wherein a display unit is provided, which displays the biasing-force characteristic chart of the biasing unit, indicating a change in the clamping force with respect to a tool clamping frequency by the collet.

11. The spindle device of machine tool according to claim 8, wherein the rod-pressing-force detecting unit continuously detects the pressing force at least from a time when an operation of the drive has been initiated.

12. The spindle device of machine tool according to claim 8, wherein the rod-displacement-detecting unit continuously detects the displacement of the rod at least from a time when an operation of the drive has been initiated.

* * * * *